Sept. 5, 1961 J. P. FERRIS 2,998,690
POWER DRIVEN LAWN RAKE
Filed Dec. 16, 1957
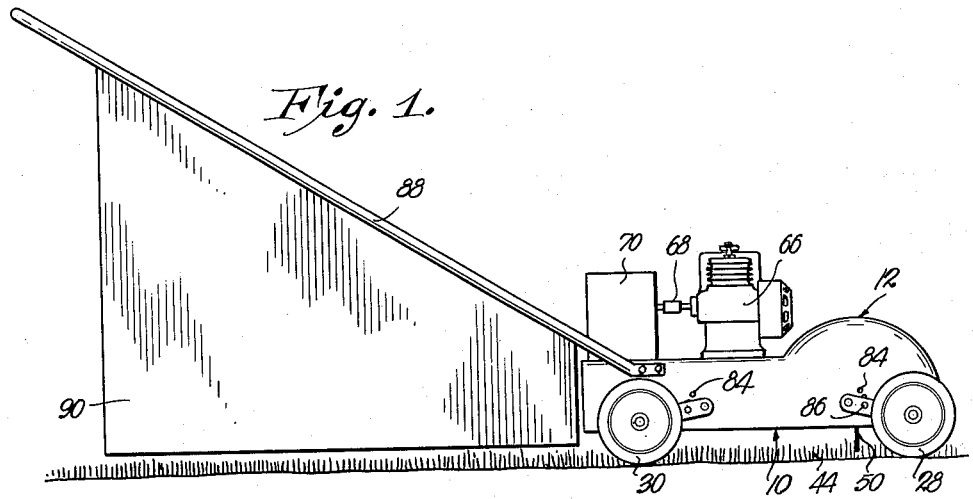
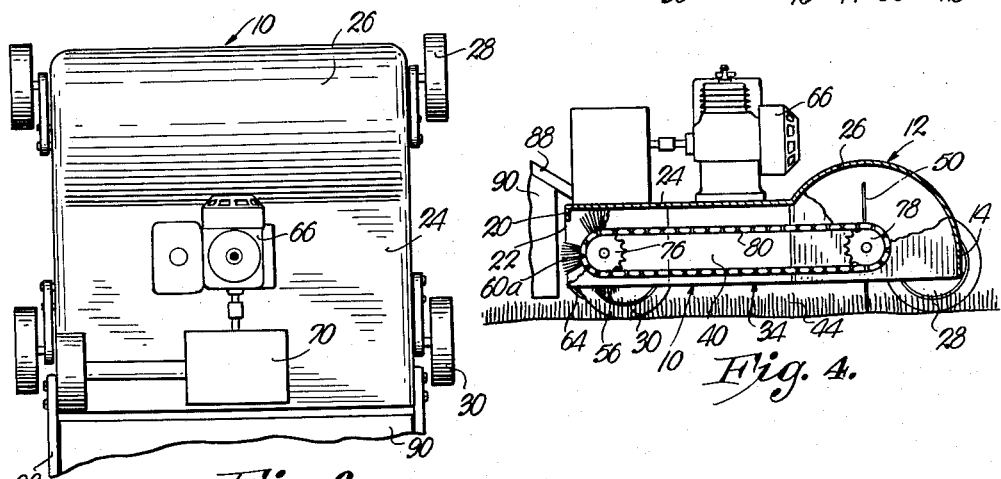
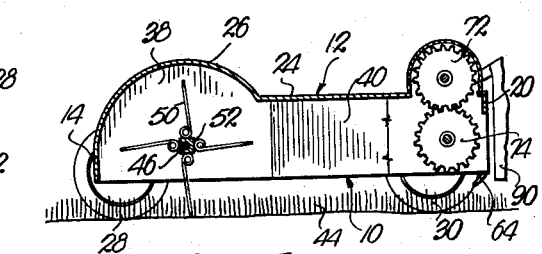
INVENTOR.
John P. Ferris
BY
ATTORNEY.

2,998,690
POWER DRIVEN LAWN RAKE
John P. Ferris, Lincoln, Nebr.
(501 Ohio St., Oshkosh, Wis.)
Filed Dec. 16, 1957, Ser. No. 703,145
8 Claims. (Cl. 56—27)

This invention relates broadly to the field of power operated lawn equipment, the primary object of the invention being to provide a power driven rake which is capable of picking up loose grass as well as leaves even when the same are in a moist and matted condition, for subsequent direction to a suitable catcher device carried by the housing of the rake.

Another important object of the present invention is to provide a power operated lawn rake which includes mutually cooperable components that initially pick up leaves and loose grass even though the same are matted within the blades of live grass, and subsequently sweep the loose material picked up into the catcher device mounted on the housing of the rake to thereby present a clean lawn by merely advancing the power operated rake across the same.

Also an important object of this invention is to provide a power driven lawn rake including a housing having an outlet opening and a pair of spaced structures rotatably mounted within the housing and driven by a suitable prime mover in one direction, one of the structures being adapted to initially rake up loose grass and leaves onto the top of the live grass whereupon the other structure brushes the loose material into a suitable receptacle carried by the housing in a manner so that the lawn is literally swept clean as the rake is advanced over the same.

Other important objects of the present invention relate to the provision of a power operated lawn rake wherein the structure for picking up loose grass and leaves from the lawn includes a plurality of radially extending, circumferentially and longitudinally spaced pick-up tines resiliently mounted on the rotatable shaft of the structure so that matted grass and leaves are picked up and disposed on the top of the growing grass, yet engagement of the pick-up tines with relatively immovable objects such as stones or the like does not injure the mechanism because the inherent resiliency of the tines and the manner in which the same are mounted on the structure; to the provision of an elongated, rotatable brush disposed between the pick-up structure and the discharge opening of the housing to brush the loose leaves and grass disposed on the live grass into a suitable receptacle on the rake as the latter is advanced across the lawn; to the provision of a power operated lawn rake as described wherein the elongated brush is somewhat longer than the length of the structure having pick-up tines thereon so that all of the loose material picked up by the tines are brushed into the receptacle and formation of windrows is substantially precluded; to the provision of a pair of spaced baffles within the housing and disposed at corresponding ends of the pick-up structure and the brush to cause the loose material picked up by the structure to be channeled into a position where the same may be readily directed into the receptacle on the rake housing as the latter is advanced across the lawn; to the provision of a segmented brush on the housing whereby better pick up of loose grass and large pieces of refuse is obtained and which also serves to make the rake much easier to push; to the provision of a plurality of wheels on the rake housing which are adjustable in vertical planes so that the relative elevation of the brush and the pick-up structure may be varied at will; and to other lesser important objects and details of construction which will become obvious as the following specification progresses.

In the drawing:
FIGURE 1 is a side elevational view of a power operated lawn rake embodying the concepts of the present invention;
FIG. 2 is a slightly enlarged, fragmentary, plan view of the rake mechanism illustrated in FIG. 1;
FIG. 3 is a slightly enlarged, plan view similar to FIG. 2 with the top of the rake housing being removed to illustrate details of construction of the rake;
FIG. 4 is a slightly enlarged, fragmentary, side elevational view similar to FIG. 1 with the side wall of the rake housing being removed to illustrate the interior of the rake housing and certain parts therein broken away to reveal details of construction of the machine; and
FIG. 5 is a vertical, cross-sectional view taken substantially on the broken line 5—5 of FIG. 3.

A power driven lawn rake constructed in accordance with the principal concepts of the present invention is broadly designated by the numeral 10 and includes a hollow, open bottom, polygonal housing 12 having a substantially vertical front wall 14, a pair of spaced side walls 16 and 18 disposed in vertical planes, and a relatively narrow rear wall 20 presenting a discharge opening 22. The top wall of housing 12 joined to walls 14, 16, 18 and 20 includes a substantially planar section 24 integral with a cylindrical segment 26 integral with section 24 and walls 14, 16 and 18 respectively.

A pair of wheels 28 and 30 are adjustably mounted on each of the side walls 16 and 18 for movement in a vertical plane, for reasons to be hereinafter defined. Spaced baffles 32 and 34 mounted within housing 12 and extending the length thereof between walls 14 and 20 are positioned adjacent side walls 16 and 18 respectively, it being noted that each of the baffles 32 and 34 includes a stretch 36 proximal to rear wall 20 which is closer to side walls 16 and 18 respectively than the stretch 38 thereof which is adjacent front wall 14. Intermediate stretches 40 of baffles 32 and 34 interconnect respective stretches 36 and 38 so that baffles 32 and 34 converge as front wall 14 is approached.

Pick-up structure broadly designated 42 and adapted for picking up leaves and grass within the blades of growing grass 44 includes an elongated shaft 46 rotatably and substantially horizontally mounted on stretches 38 of baffles 32 and 34 proximal to wall 14 and beneath cylindrical segment 26 of housing 12. An elongated, tubular sleeve 48 is secured to shaft 46 between baffles 32 and 34 and extends substantially the entire distance between stretches 38 of the same. A plurality of pick-up tines 50 are mounted on sleeve 48 in radially extending, circumferentially and longitudinally spaced relationship by suitable clamps 52. Tines 50 are constructed of elongated, resilient bar stock and the innermost ends thereof, which are clamped to sleeve 48, are bent to present a spring coil 54 so that tines 50 are normally biased into radially extending positions but will bend under pressure by virtue of the inherent resiliency of coils 54, as well as the characteristics of the bar stock from which tines 50 are constructed. It is pointed out that tines 50 are disposed on substantially the entire length of sleeve 48 between stretches 38 of baffles 32 and 34 so that loose grass and leaves within blades of grass 44 are picked up and disposed on the top of the growing grass 44 throughout the area covered by stretches 38 of baffles 32 and 34.

Segmented brush structures 56 mounted within housing 12 between structure 42 and discharge opening 22 includes an elongated shaft 58 rotatably and substantially horizontally mounted on stretches 36 of baffles 32 and 34 in substantial parallelism with shaft 46, and has a plurality of bristles 60 disposed on that portion thereof between stretches 36 of baffles 32 and 34 to present a number of individual, circumferentially spaced segments 60a. An elongated, transversely arcuate shoe 64 is mounted on the lowermost edges of side walls 16 and 18 proximal to rear wall 20, and as clearly shown in FIG. 4, shoe 64 is positioned in parallel relationship to brush structure 56 and located therebeneath in a manner so that the outermost ends of bristles 60 slightly engage the inner arcuate surface of shoe 64.

Mechanism for continuously rotating structures 42 and 56 in one direction includes a gasoline engine 66 mounted on the uppermost surface of section 24 with the power shaft 68 thereof disposed in a horizontal position and operably coupled to a gear box 70, which is in turn connected to the uppermost of a pair of interconnected power transmitting gears 72 and 74 disposed in a vertical plane with gear 74 suitably connected to the end of shaft 58 proximal to side wall 16. Spur gear 76 rigidly connected to the outermost end of shaft 58 proximal to wall 18 is operably connected to spur gear 78 attached to the outermost end of shaft 46 adjacent side wall 18 by endless chain structure 80, so that upon operation of engine 66, shafts 46 and 58 are continuously rotated in one direction.

Wheels 28 and 30 are rotatably mounted on elongated links 82 which are in turn pivotally mounted on corresponding side walls 16 and 18 so that wheels 28 and 30 are swingable in a substantially vertical plane. Side walls 16 and 18 are provided with a plurality of openings 84 adjacent respective wheels 28 and 30 and disposed in an arcuate line in a manner to selectively receive bolts 86 so that the relative positions of wheels 28 and 30 may be varied at will.

A substantially U-shaped handle 88 is secured to side walls 16 and 18 of housing 12 and a grass and leaf receptacle 90 is secured to handle 88 in a position so that loose material discharged through outlet 22 is directed into receptacle 90.

In operation, gasoline engine 66 is started to rotate structures 42 and 56 in a clockwise direction viewing FIG. 4 by virtue of the power train through gear box 78, gears 72 and 74, spur gear 76 and 78, and endless chain 80. The person operating rake 10 then advances the same across the area of the lawn to be cleaned by pushing on handle 88, whereupon tines 50, rotating about the axis of shaft 46, pass into the blades of growing grass 44 and thereby pick up loose grass and leaves and deposit the same upon the top of grass 44 as rake 10 is advanced. It can be appreciated that because of the fact that tines 50 pass into grass 44, dead grass and matted leaves are readily raked up and deposited upon the top of growing grass 44 during forward movement of the power driven rake 10.

It can be seen that the lowermost part of brush structure 56 is disposed adjacent the top of growing grass 44 so that as rake 10 is moved forwardly, loose material raked up and deposited on the top of grass 44 is directed over the arcuate upper face of shoe 64 by bristles 60 of brush structure 56 into receptacle 90 through opening 22. Therefore, the lawn is swept clean as rake 10 is advanced and because of the fact that brush structure 56 is longer than the sleeve 48 upon which tines 50 are disposed, all material picked up by structure 42 is directed into receptacle 90 without the formation of windrows or the like. In this respect it can be appreciated that baffles 32 and 34 cooperate with structures 42 and 56 to prevent such windrows as rake 10 is moved forwardly across the lawn.

The relative elevations of structures 42 and 56 may be readily changed at will by merely removing bolts 86 from openings 84 and reintroducing the bolts into other openings to vary the vertical positions of wheels 28 and 30 with respect to housing 12. The height of grass 44 will determine the elevations of structures 42 and 56 and the irregularity of the terrain over which rake 10 is being advanced. Accidental damage to the rotating mechanism of rake 10 is prevented because of the fact that tines 50 as well as bristles 60 of structure 56 readily give when the same engage any immovable object such as rocks or the like.

The manner in which bristles 60 are divided into individual, circumferentially spaced segments 60a is of importance because this configuration of brush structure 56 aids materially in the ability of rake 10 to pick up loose grass and large particles of refuse. Segments 60a function in a way very similar to an actual rake and the over-all efficiency of the machine is greatly increased. Note should also be taken of the fact that brush structure 56 is preferably rotated in a clockwise direction viewing FIG. 4 and thus segments 60a tend to advance rake 10 forwardly so that much less effort is needed to propel the same than would ordinarily be the case. This forward force vector produced by brush structure 56 is even more pronounced in heavy grass and although it is ordinarily more difficult to rake grass of this type, such is not true with rake 10 because of the tendency of brush structure 56 to pull the machine into the area to be raked. It has been found that rake 10 will respond to a very slight pushing action to advance the same and this is true regardless of the nature of the lawn being raked.

Having thus described the invention what is claimed as new and desired to be secured by Letters Patent is:

1. In a lawn raker, a hollow, open bottom, wheel-supported housing having a top wall, a pair of spaced side walls depending from the top wall, and a discharge opening at the rear extremities of said side walls and below said top wall; an elongated shaft rotatably and substantially horizontally mounted within the housing transversely of said side walls and remote from said opening; a plurality of radially extending, longitudinally spaced pickup tines secured to a designated length of said shaft, the latter normally being disposed in a position to cause the tines to pass through the grass of the lawn during rotation of the shaft; an elongated brush rotatably and substantially horizontally mounted within the housing between said shaft and the opening in substantial parallelism with said shaft and normally positioned to engage only the upper part of said grass during rotation thereof; means on the housing and operably connected to said shaft and the brush for simultaneously rotating the same in one direction; and shoe means mounted on the housing and extending the length of said brush in proximity to the same therebeneath whereby, as the raker is advanced, loose material picked up from the lawn by said tines is confined within said housing, deposited on said upper part of the grass rearwardly of the shaft and subsequently discharged through said opening by the brush cooperating with said shoe means.

2. In a lawn raker, a hollow, open bottom, wheel-supported housing having a top wall, a pair of spaced side walls depending from the top wall and a discharge opening at the rear extremities of said side walls and below said top wall, said side walls having longitudinal edges below said top wall and disposed proximal to the grass defining said lawn; an elongated shaft rotatably and substantially horizontally mounted within the housing transversely of said side walls and remote from said opening; a plurality of radially extending, circumferentially and longitudinally spaced pickup tines secured to a designated length of said shaft, the latter normally being disposed in a position to cause the tines to pass through the grass of the lawn during rotation of the shaft; an elongated brush rotatably and substantially horizontally mounted within the housing between said shaft and the opening in substantial parallelism with the shaft and normally positioned to engage only the upper part of said grass during rotation thereof, said brush extending outwardly beyond both ends of said designated length of the shaft; and means on the housing and operably connected to said shaft and the brush for simultaneously rotating the same in one direction whereby, as the raker is advanced, loose material picked up from the lawn by said tines is confined within the housing, deposited on said upper part of the grass rearwardly of the shaft, and subsequently discharged through the opening by the brush.

3. A lawn raker as set forth in claim 2, wherein each of said tines comprises an elongated length of resilient bar material, the end of the bar material connected to said shaft being coiled whereby the tines are resiliently maintained in their normally radially extending positions.

4. A lawn raker as set forth in claim 2, wherein is provided a pair of spaced, substantially vertical baffles mounted within the housing, said baffles extending the full length of the housing at corresponding ends of the brush and said lengths of the shaft respectively.

5. A lawn raker as set forth in claim 4, wherein said baffles converge as the shaft is approached.

6. In a lawn raker, a hollow, open bottom, wheel-supported housing having a top wall, a pair of spaced side walls depending from the top wall, and a rear wall depending from the top wall and provided with a discharge opening therein, said side walls having longitudinal edges disposed proximal to the grass defining said lawn; an elongated shaft rotatably and substantially horizontally mounted within the housing remote from said opening; a plurality of radially extending, circumferentially and longitudinally spaced pickup tines secured to a designated length of said shaft, the latter normally being disposed in a position to cause the tines to pass through the grass of the lawn during rotation of the shaft; an elongated brush element rotatably and substantially horizontally mounted within the housing between said shaft and the opening, and normally positioned to engage only the upper part of said grass during rotation thereof; means on the housing and operably connected to said shaft and the brush for simultaneously rotating the same in one direction whereby as the raker is advanced, loose material picked up from the lawn by said tines is confined within said housing, deposited on said upper part of the grass rearwardly of the shaft and subsequently discharged to said opening by the brush; and means carried by the housing for independently varying the relative elevations of said brush and the shaft respectively.

7. In a lawn raker, a hollow, open bottom, wheel-supported housing having a top wall, a pair of spaced side walls depending from the top wall, and a rear wall depending from the top wall and provided with a discharge opening therein, said side walls having longitudinal edges disposed proximal to the grass defining said lawn; an elongated shaft rotatably and substantially horizontally mounted within the housing remote from said opening; a plurality of radially extending, circumferentially and longitudinally spaced pickup tines secured to a designated length of said shaft, the latter normally being disposed in a position to cause the tines to pass through the grass of the lawn during rotation of the shaft; an elongated brush element rotatably and substantially horizontally mounted within the housing between said shaft and the opening and normally positioned to engage only the upper part of said grass during rotation thereof; means on the housing and operably connected to said shaft and the brush for simultaneously rotating the same in one direction whereby as the raker is advanced, loose material picked up from the lawn by said tines is confined within said housing, deposited on said upper part of the grass rearwardly of the shaft and subsequently discharged through said opening by the brush; and means adjustably mounting each of the wheels on said housing for movement in vertical planes whereby the relative elevations of said brush and the shaft may be selectively and independently varied.

8. A lawn raker as set forth in claim 7, wherein said brush element is divided into a plurality of individual, circumferentially spaced, longitudinal segments.

References Cited in the file of this patent

UNITED STATES PATENTS

| | | |
|---|---|---|
| 661,081 | Sellstrom | Nov. 6, 1900 |
| 1,255,275 | Barnett et al. | Feb. 5, 1918 |
| 1,439,832 | Merrill | Dec. 26, 1922 |
| 1,846,507 | Boring | Feb. 23, 1932 |
| 2,242,922 | Poynter | May 20, 1941 |
| 2,268,250 | Gormley et al. | Dec. 30, 1941 |
| 2,328,278 | Innes | Aug. 31, 1943 |
| 2,505,576 | Reitan | Apr. 25, 1950 |
| 2,642,710 | Tucker | June 23, 1953 |
| 2,670,486 | Daniell | Mar. 2, 1954 |
| 2,687,607 | Sewell | Aug. 31, 1954 |
| 2,760,327 | Bovee | Aug. 28, 1956 |
| 2,845,769 | Hintz et al. | Aug. 5, 1958 |

FOREIGN PATENTS

| | | |
|---|---|---|
| 550,670 | Great Britain | Jan. 19, 1943 |